July 3, 1945.　　　A. L. SPRECKER　　　2,379,836
TIME SYSTEM
Filed March 16, 1943　　　4 Sheets-Sheet 1
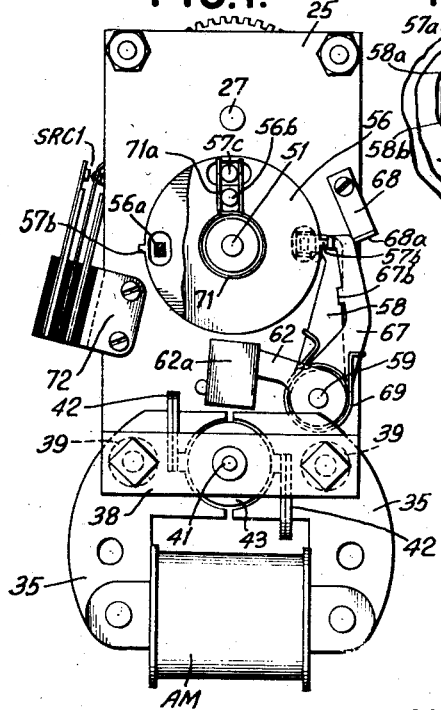
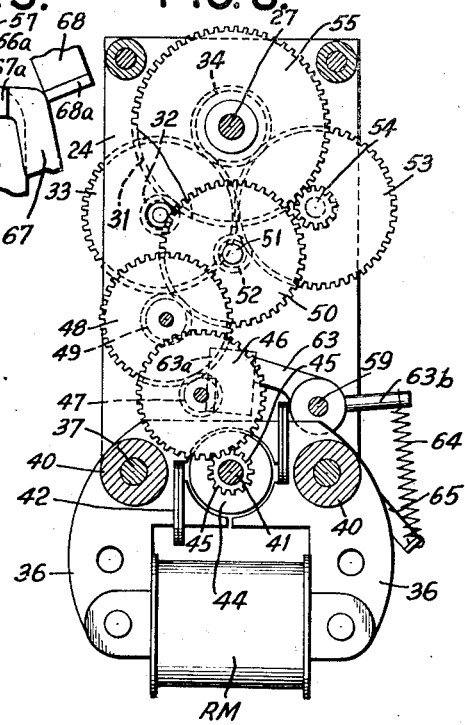
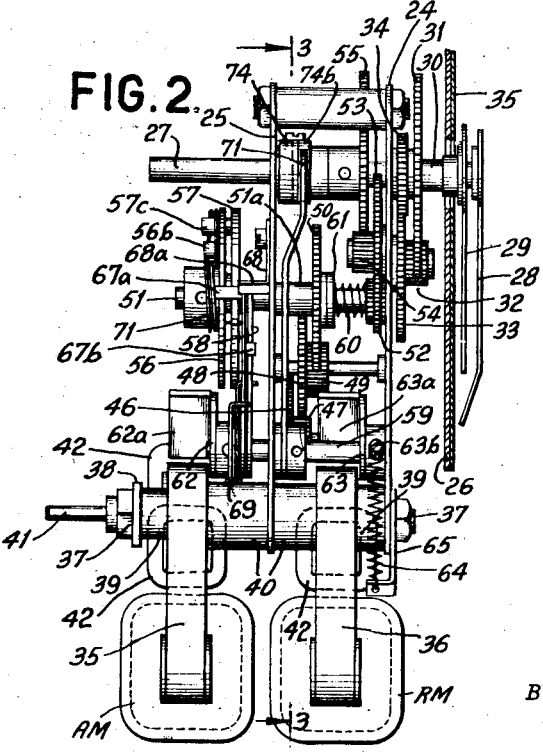
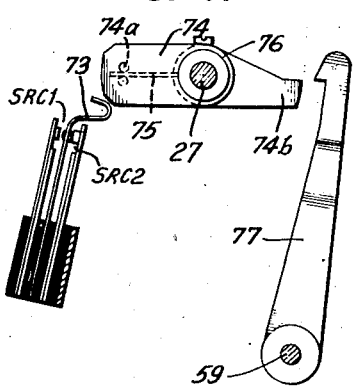
INVENTOR
Alfred L. Sprecker
BY
ATTORNEY July 3, 1945.  A. L. SPRECKER  2,379,836
TIME SYSTEM
Filed March 16, 1943  4 Sheets—Sheet 2
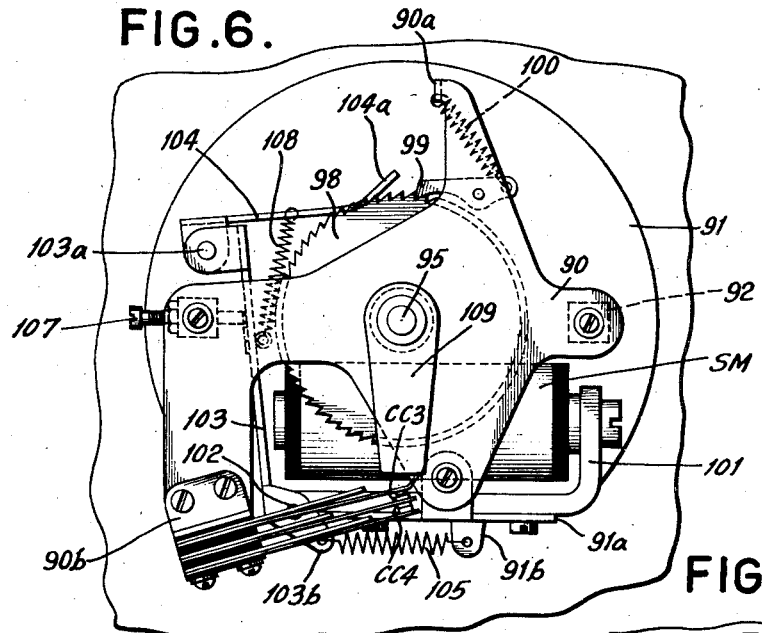
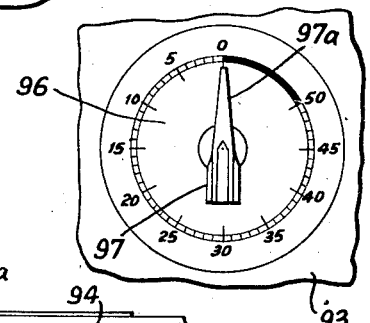
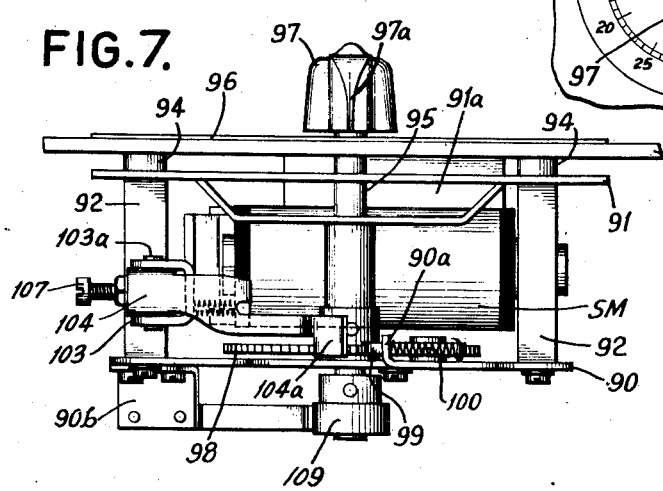
INVENTOR
Alfred L. Sprecker
BY
ATTORNEY

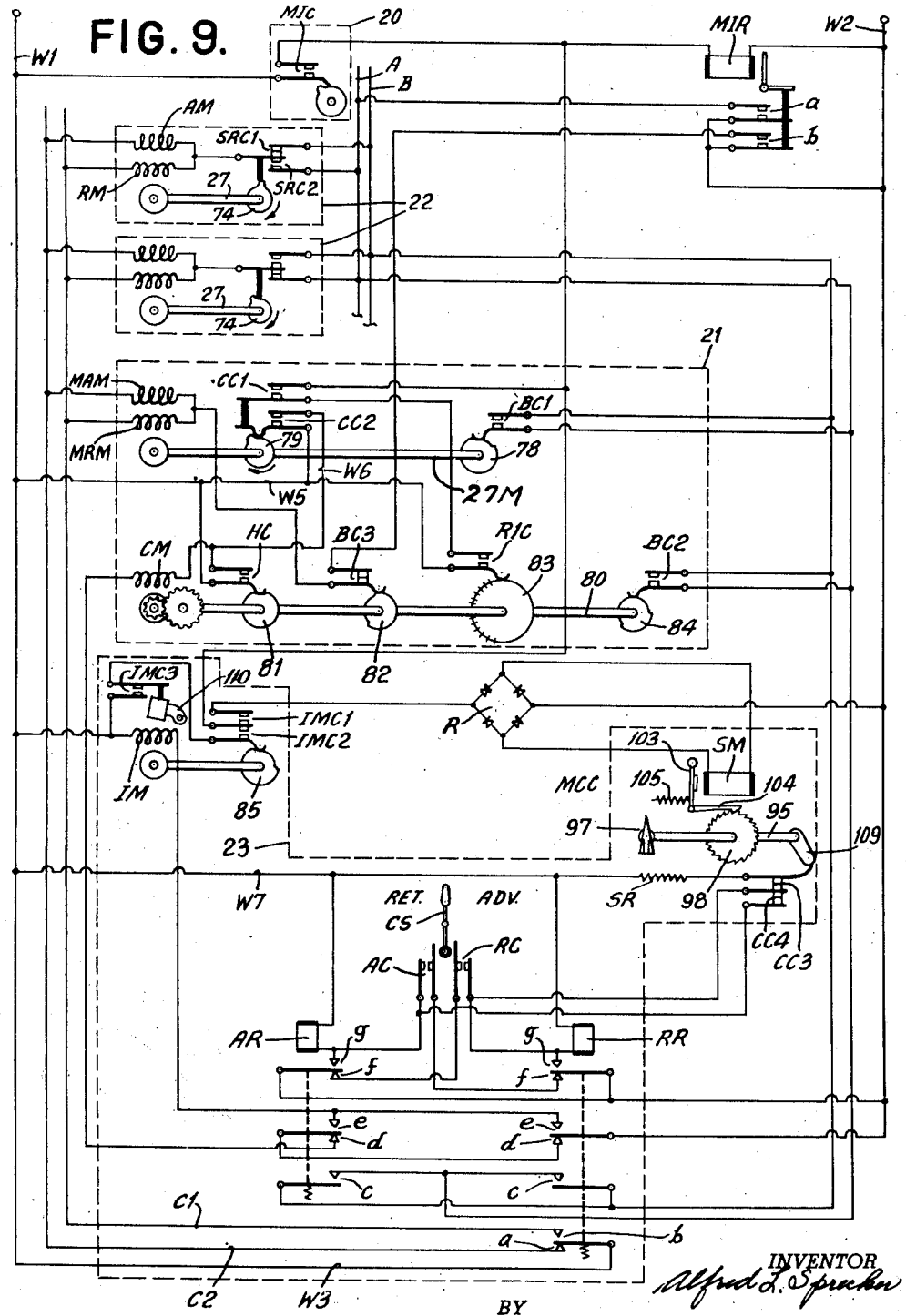

July 3, 1945.  A. L. SPRECKER  2,379,836
TIME SYSTEM
Filed March 16, 1943   4 Sheets-Sheet 4
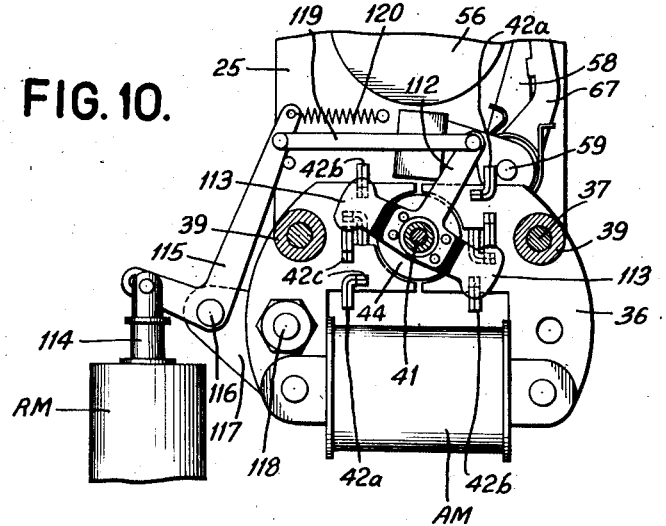
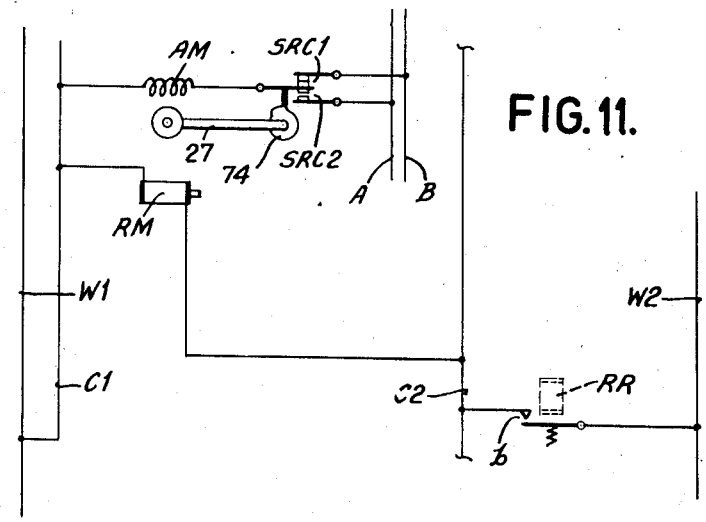
INVENTOR
Alfred L. Sprecker
BY
ATTORNEY Patented July 3, 1945

2,379,836

UNITED STATES PATENT OFFICE 2,379,836

TIME SYSTEM

Alfred L. Sprecker, Freeport, N. Y., assignor to International Business Machines Corporation, New York, N. Y., a corporation of New York Application March 16, 1943, Serial No. 479,345

19 Claims. (Cl. 58—24)

This invention relates to periodically supervised self-regulating time systems and more particularly to systems suitable for marine use.

An object of the present invention is to provide an automatically supervised self-regulating time system with controlling means enabling the system to be corrected when made necessary by the progress of a vessel easterly or westerly through different time belts or zones on the earth.

In time systems for use on land, the apparatus is fixed in location or remains in a definite time belt and the only correction or periodic change required is the relatively small occasional corrections arising from lack of isochronism of the pendulum, and the bi-yearly changes to and from daylight saving time.

In the case of time systems on ships traveling on the high seas, during the course of each eastward or westward passage, it is necessary to make very material corrections of the clocks at rather frequent intervals, particularly in the case of fast vessels which require only three or four hours to traverse a degree of longitude. Thus a 20-knot passenger ship cruising at normal speed can easily cover 480 miles in a day's run which is roughly equivalent to 7° of longitude or a little less than one half an hour. In other words, with such a ship, the correction required would be approximately a half hour advance of the clocks per day when traveling due east or a retardation of a similar amount when traveling due west.

It is an object of the present invention to provide a supervised self-regulating time system in which the periodic and frequent corrections made necessary on ship board may be effected more conveniently than heretofore.

An object is to provide a supervised self-regulating marine time system with a more convenient and accurate method and means of setting the clocks of the system as a whole whenever a correction is required which requires advancing or retarding of the clocks an amount greater than can be accomplished by the usual self-regulating system.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front elevation of one of the clock movements, such as a secondary clock.

Fig. 2 is a right side elevation.

Fig. 3 is a vertical section on the line 3—3 in Fig. 2.

Fig. 4 is a large scale view of certain contacts used in the secondary clocks of the system.

Fig. 5 is a large scale detail view of the clutch detent mechanism.

Fig. 6 is a rear view of the time correcting controller.

Fig. 7 is a plan view of the time correcting controller.

Fig. 8 is a reduced view of the setting knob and dial for the time correcting controller.

Fig. 9 is a wiring diagram of the complete system.

Fig. 10 is a partial front elevation of a modified form of driving motor for the clock movements.

Fig. 11 is the modification of the wiring in Fig. 10 necessary to utilize the modified motor shown in Fig. 10.

The system herein disclosed comprises four basic mechanisms or groups of controls, of which three comprise the self-regulating system, while the fourth group comprises the time correcting controller. These mechanisms or controls consist of the source of minute impulses (Fig. 9) represented by the dotted rectangle 20, a master clock group 21, one or more secondary clock groups 22, and the time correcting controller 23.

The minute impulse source 20 may consist of a fairly accurate clock such as a ship's chronometer or a clock of comparable accuracy equipped with suitable minute impulse contacts MIC (Fig. 9) enabling the minute impulse relay MIR to be impulsed once per minute over the circuit leading from line wire W1, through the minute impulse contacts MIC, and the coil of relay MIR, to line wire W2. Conveniently the source of current may be alternating current derived from the ship's light and power generators.

The mechanical construction of the movement of the master clock 21 and the secondary clocks 22 is essentially the same and is shown in Figs. 1 to 5 which may be considered as illustrating the construction of a secondary clock.

The clock movement includes the front frame plate 24 and the rear frame plate 25 suitably supported within the case of which the front is closed by a dial plate designated 26 in Fig. 2. This plate 26 is provided with an opening through which projects the minute shaft 27 on which is secured the minute hand 28. The shaft 27, or minutes arbor as it is commonly called, is rotatable in bearings in the plates 24, 25 and loosely rotatably support the hour hand 29 which is connected by means of a hollow spindle to the driven gear 31. The gear 31 meshes with a pinion 32 fixed to a gear 33 rotatably mounted on a stud carried by the plate 24. Gear 33 meshes with a pinion 34 fixed to the minute arbor 27. The ratio between the minutes arbor 27 and hand 28 and the hour hand 29 is 1:12 in the case of a clock having a dial having only twelve main divisions representing the hours.

On the outer face of a portion of the dial plate 26 is a dial 35 which, as is customarily the case, may be subdivided into 60 minutes by means of suitable graduations of which every fifth represents an hour. The minute hand is advanced once per minute under control of the minute impulse relay MIR through a reversible electric motor drive mechanism which is geared to the minute arbor 27 through a suitable clutch.

The driving motor comprises two opposed alternating motor current motors of the self-starting shaded pole type having their armatures mechanically joined together for rotation in unison. The reference numerals 35, 36 designate the pairs of pole pieces of the forward drive motor and the reverse drive motor, respectively, for advancing and retarding the clock. Each pair of pole pieces 35, 36 is part of the magnetic circuits of the two motors provided by a coil designated AM in the case of the forward or advancing motor, and RM for the reversing or retarding motor. The pole pieces 35, 36, as is usually the case, may be composed of suitable laminations clamped together by means of the bolts 37 which extend through a cross bar 38, the pole pieces and the frame plates 24, 25. The cross bar 38 and the pole pieces 35, 36 are spaced from each other and from the frame plates 24, 25 by means of suitable bushings 39 and 40. The cross bar 38 together with the frame plate 24 rotatably support the armature shaft 41 which is common to both motors and is rotatable in bearings in bar 38 and plate 24.

The pole pieces 35, 36 are provided with the usual shading coils 42 which are reversed in position on the motors so that the armature 43 (Fig. 1) of the advance motor rotates clockwise when the coil AM is energized and the armature 44 of the retarding motor rotates counterclockwise when coil RM is energized. As will be seen hereinafter the coils AC and RC are energized selectively under control of the time correcting controller to advance or retard the clock to the extent desired.

The armature shaft 41 is geared to the minute arbor 27 through a train of gearing which includes the pinion 45 secured to the shaft 41 and meshing with a gear 46. A pinion 47 is secured to the gear 46 and meshes with a gear 48. A pinion 49 is secured to gear 48 and meshes with a gear 50 loose on the shaft 51 which is rotatably supported in the plates 24, 25. Secured to the shaft 51 is a pinion 52 meshing with a gear 53 to which is secured a pinion 54 meshing with a gear 55 fixed to the shaft 27.

The shaft 51 is coupled to the gear 50, when it is desired to advance or retard the clock, by means of a half-revolution clutch which is released by means of the magnetic field between the pole pieces 35, 36 as the case may be, when the coils AM or RM are energized. This clutch is shown in Figs. 1, 2, and 5 and comprises a disk 56 secured to the end of shaft 51. This disk is provided with two diametrically located pins 56a which project through oval openings 57a in a disk 57 loose on the hub by means of which the disk 56 is secured to shaft 51, whereby the disk 57 is capable of limited rotational movement in either direction relative to the disk 56. Normally one of the pins 56a lies between two lugs 58a, 58b on a detent arm 58 secured to a cross shaft 59 rotatably mounted in the plates 24, 25 whereby the disk 56 is held against rotation. The gear 50 is loose on the shaft 51 which is provided with an enlargement or shoulder 51a (Fig. 2) against which the gear 50 is pressed by means of a coil spring 60 interposed between pinion 52 and a washer 61 pressed by the spring against the side of the gear 50.

Secured to the shaft 59 are the armature levers 62, 63 which have large armature blocks 62a, 63a just over but separated from the air gaps between the pole pieces 35, 36. The set screw 63b (Figs. 2 and 3) which secures the arm 63 to the shaft 59 is made relatively long and is provided with a groove adjacent the slotted head which acts as an anchor for the spring 64 anchored to a bracket 65 secured to the frame plate 24.

Loosely mounted on the hub of the arm 58 is a detent 67 having an offset lug 67a designed to cooperate with a lug 57b extending from the periphery of the disk 57. The detent arm 67 is urged in a counterclockwise direction relative to the arm 58 in Fig. 1 by means of a torsion spring 69 coiled around the hub 62 and the arm 67 is formed with an offset lug 67b in the plane of the arm 58. The spring 69 normally holds the arm 58 against the lug 67b. Spring 64 urges the shaft 59 and arms 62 and 63 in a clockwise direction (Figs. 1 and 3) so as to normally hold the arm 67 against an offset lug 68a on a stop 68 secured to the plate 25. In this position the lugs 58a, 58b have the position shown in Fig. 5 to prevent rotation of the disk 56.

Normally the disk 57 is held in a central position with respect to the disk 56 so that the pins 56a are in the centers of the oval openings 57a in disk 57 as shown in Fig. 5. This is accomplished by means of a torsion spring 71 having a few turns around the hub of the disk 56 and branches 71a bent parallel with a radius of the disk 56 which extends through the centers of the pins 56b carried by disk 56 and a pin 57c extending through an oval opening in the disk 56 similar to the openings 57a. If the disk 57 is moved clockwise in Fig. 1 relative to disk 56 the pin 57c will move to the right and lift the right hand branch 71a of spring 71 away from the pin 56b and such branch 71a will tend to return the disk 57 to the central position when the said disk is released. Similarly, if the disk 57 is moved in a counterclockwise direction the left hand portion 71a will restore the disk to the central position.

When the coil AM for advancing the clock is energized the magnetic field formed by the leakage flux at the air gap of the pole pieces 35 will rock the arm 62 in a counterclockwise direction (Fig. 1). This will cause the arm 58 to be rocked in the same direction thereby moving the lug 58a to the left in Fig. 5 far enough to release the pin 56a. At the same time, the armature 43 of the advance motor will commence to turn with the result that the gear 50 will start to rotate in a counterclockwise direction (Fig. 3) thereby rotating the shaft 51 and disk 56. When the arm 58 is moved the arm 67 will be temporarily prevented from following it owing to the presence of the lug 57b in the path of the lug 67a (Fig. 5). However, after the disk 56 has been turned a few degrees, the lug 57b will travel upwardly in Fig. 5 far enough to release the arm 67, permitting the spring 69, which has previously been tensioned by the counterclockwise movement of the arm 58, to draw the arm 67 in a counterclockwise direction until the lug 67b again strikes the edge of the lever 58. In other words, the lug 67a will ride off the first lug 57b and take a position in the path of the second lug 57b which is diametrically opposite the one shown in Fig. 5, that is, the right hand lug in Fig. 1.

When the disks 56 and 57 have almost completed a half-revolution lug 57b will engage the lower edge of lug 67a and hold the disk 57 against movement in a counterclockwise direction. The disk 56, however, will be free to turn an additional amount sufficient to bring the pin 56 into horizontal alignment with the middle of the space between the lugs 58a, 58b. The dimensions of the openings 57a in the disk 57 are so proportioned that when the lug 57b is stopped by lug 67a the pins 56a and consequently disk 56 can only move far enough to position one of said pins horizontally opposite the spaces between the lugs 58a, 58b. If now the coil AM is deenergized, the arm 62 will be released, permitting the arms 58 and 67 to rock back to the position of Figs. 1 and 5. The lugs 58a, 58b will be free to move to positions over and below, respectively, the pin 56a and the length of the lug 57b is such that, before lug 67a clears the lug 57b, the lugs 58a, 58b will be well into the path of movement of the pin 56a. Thus the lugs 57b, 58a, 58b, and 67a function like an escapement device to permit two increments of movement of the disks 56, 57, which increments comprise exactly a half-revolution of the shaft 51 and disk 56 for each cycle of operations of the clutch.

When the coil RM of the retarding motor is energized the same action will take place, but, due to the fact that the shading coils 42 for this motor are reversed in position, the armature 44 for this motor will be rotated in a counterclockwise direction whereby the shaft 51 will be rotated clockwise instead of counterclockwise a half-revolution.

As will be made clear hereinafter, the duration of the current given to the coils AM and RM is such that the motor is capable of driving disk 56 a full half-revolution before the arms 62, 63 are released. After the lug 67a has cleared the lug 57b due to release of the arms 58 and 67, the disk 56 will be held against rotation in either direction by the lugs 58a, 58b and the lug 57b will be restored to the position of Fig. 5 by snapping under the lug 67b through the action of the spring 71 which is tensioned whenever the relative movement takes place between disks 56 and 57 at the end of a half revolution.

The gear ratio between the shaft 51 and the minute arbor 27 is 1:30, and, since shaft 51 makes a half-revolution for each operation, the arbor 27 and hence the minute hand 28 will turn 1/60 of a revolution. Thus, for each cycle of operation of the clutch mechanism and the advance or retarding motors, the clock will be advanced or retarded, as the case may be, one minute.

Each secondary clock is provided with control contacts which are brought into play during the periods in which the clocks are being regulated and are provided for the purpose of determining whether the clocks are fast or slow with respect to the master clock to enable the proper correction to be made. These contacts are designated SRC1, SRC2 and are insulatably mounted on a bracket 72 fixed to the plate 25. The contacts SRC1, SRC2 are of the transfer type having a central contact member 73 shaped to be actuated by one arm of a cam lever 74 loose on the shaft 27. The cam lever 74 is not secured to the shaft 27, but is flexibly connected thereby by a flexible element 75 which may take the form of a piece of piano wire or a leaf spring radially extending from a hub 76 secured to the shaft 27. The member 75 is loosely connected to the lever 74 by means of pins 74a carried by the lever 74 between which the member 75 extends. The arm of the cam lever 74 having the pins 74a is shaped so that the contacts SRC1 remain open from 4 minutes after the even hour up to the time of the 59th minute impulse and are closed at that time and kept closed from the 59th minute impulse to the 4 minute impulse. The contacts SRC2 remain closed during the period from 4 minutes after the hour to the 59th minute impulse. As will be made clear hereinafter the contacts SRC1, SRC2 function, as in well known hourly supervised clock systems, to delineate a self-regulating period which, in conjunction with the master clock controls, effects the automatic regulation of the clocks hourly.

Secured to the shaft 59 is a detent arm 77 designed to hook over the arm 74b of lever 74, when the coil AM is energized by the 59th minute impulse, to prevent immediate rotation of the lever 74. The purpose of this detent lever 77 will be made clearer hereinafter. For the present it will be sufficient to state that, when the detent lever 77 is operated in response to an impulse to the coil AM, it will hook over the end of the arm 74b and prevent lever 74 from rotating counterclockwise. The shaft 27, however, will be turned and tension the spring member 75, the shaft rotating 1/60 of a revolution or 6° in consequence of the 59th minute impulse to the coil AM of the motor.

As soon as the coil AM is deenergized and the detent 77 released, the arm 74 will be freed and rotated 6° in a counterclockwise direction by the spring 75, thereby closing the contacts SRC1. This insures that when the 59th impulse is received to start the self-regulating period that the coil AM will receive a full impulse of current and that the circuit for the coil will not be interrupted during the transfer movement of the contact member 73.

The master clock 21 includes a movement similar to the one shown in Figs. 1 to 5 with the exception that the shaft 27M (Fig. 9), corresponding to the shaft 27, is provided with two ordinary cams 78, 79 for actuating contacts which control the regulation of the clocks. Cam 78 controls the contacts BC1 and is timed to hold said contacts closed except from the 50th to the 60th minute impulse of every hour. The cam 79 controls two sets of contacts designated CC1, CC2 and closes said contacts from the 59th minute impulse to the master clock to the 60th impulse. The advance and retarding coils of the master clock are designated MAM and MRM, respectively, in Fig. 9.

The master clock includes a cycle controller driven by the controller motor CM which may be of the self-starting synchronous type commonly used in electric clocks and clock systems. This motor is geared to a shaft 80 so that the latter makes one revolution in two minutes. This shaft is provided with a series of cams 81 to 84 actuating contacts which are used to control the regulation of the clocks of the system. This controller is set in operation during the last minute of every hour for the purpose of advancing the clocks which are behind time and operates from 59 minutes of the hour to one minute after the hour.

The cam 81 actuates contacts HC which are provided for the purpose of holding the circuit for the motor CM through the last and first minute of the hour after the contacts CC2 have reopened in consequence of the normal advance of the master clock by the 60th minute impulse. Cam 81 holds contacts HC closed through all but a short portion at the end of the revolution of the shaft 80.

The cam 82 operates contacts BC3 and is timed to open the circuit to the coils MAM, MRM through the 59th minute to prevent advancing the master clock when the secondary clocks which are late are brought into step with the master clock. Accordingly the cam 82 is timed to hold the contacts BC3 open from 59 minutes and 5 seconds to 59 minutes and 45 seconds.

The cam 83 is provided with projections designed to close the rapid impulse contacts RIC fifteen times during the first half revolution of the shaft 80, that is, from 59 minutes and 10 seconds of the hour to 59 minutes and 40 seconds of the hour, at two second intervals. The cam 84 closes contacts BC2 from 59 minutes and 45 seconds to 30 seconds after the hour, that is until the middle of the first minute.

The functioning of the system in the normal way as an hourly supervised self-regulating time system will now be described in detail. Once each minute the contacts MIC (Fig. 9) close and energize the minute impulse relay MIR thereby closing the contacts A of said relay. This causes a circuit to be established as follows: Line wire W1, wire W3, the contacts A of the relay RR, wire C2, the advance magnets AM of the secondary clocks, through contacts SRC1 or SRC2 according to the status of the clocks, the wire A directly through contacts A of relay RR, MIR to line wire W2, or over the wire B, through contacts BC1, to wire A and thence through contacts A of relay MIR as before, depending upon whether the clocks are on time or behind time. The secondary clocks will be advanced one minute by the energization of the magnets AM as described above. The master clock will also be advanced one minute by a parallel circuit from the wire C2, through the coil MAM, contacts BC3, and contacts B of relay MIR, to line wire W2. Thus the master clock will be advanced in step with the secondary clocks.

There are three possible conditions which may exist with respect to any secondary clock in the system; it may be ahead of time, on time, or late. If the clock is ahead of time, its cam lever 74 will function at some time before the 59th minute, depending on how fast it is, to close contacts SRC1 and open contacts SRC2 to transfer the coil AM for such clock from the A wire to the B wire. This condition is evidenced by the secondary clock 22 at the top of Fig. 9 which is shown in the position it occupies at approximately the 59th minute position actual time, when its cam lever 74 is about to open contacts SRC1 and close contacts SRC 2. The showing of the uppermost secondary clock 22 in Fig. 9 assumes that the clock is still 5 minutes fast. This clock was originally 14 minutes fast and remained stopped throughout the 10 minute period preceding the hour.

A clock which is on time, as shown by the lowermost clock in Fig. 9, will continue to receive impulses from the 50th to 59th minutes through the contacts SRC2, over the A wire, and through contacts A of relay MIR.

All of the clocks which are behind time will also receive impulses since their contacts SRC2 likewise will still be closed.

The clocks which are fast will have remained idle varying lengths of time during the 9 minutes preceding the 59th minute impulse whereby they will fail to get the advance impulses and they will lag, depending upon how fast they are, up to a maximum of 9 minutes. If any clock is fast more than 9 minutes the remainder, not exceeding 5 minutes, will be lost during the 10 minutes regulating period of the next hour. The clocks which are behind time will remain so up to the 59th minute impulse.

The closure of contacts CC2 at the 59th minute impulse causes the cycle controller motor CM to start by a circuit as follows: line wire W1, wire W5, the contacts CC2, wire W6, the coil of motor CM, and contacts D of relays AR and RR, to line wire W2. Contacts CC1 also close a circuit from line wire W1, wire W5, through contacts RIC, CC1, and the coil of relay MIR, to line wire W2. The shaft 80 starts to turn and almost immediately the holding contacts HC are closed by cam 81. The contacts HC are in parallel with the contacts CC2 and hold the motor CM in operation for a total of two minutes at the end of the first minute of which the master clock will receive a regular minute impulse through its coil MAM, and contacts BC3, to advance the master clock to the 60th minute thereby opening contacts CC1, CC2. During the first half revolution of shaft 80, that is, the 60th minute, the contacts RIC commence to operate and cause the relay MIR to be energized at two second intervals over a circuit from line wire W1, wire W5, contacts RIC, CC1, and relay MIR, to line wire W2. All of the clocks which are on time or ahead of time will have been transferred to the now dead B wire, as described above, but the clocks which are late will receive impulses at two second intervals over a circuit traced as follows: Line wire W1, contacts A of relay RR, wire C2, the coil AM of the slow clock, contacts SRC2 of such clock, the A wire, and contacts A of relay MIR, to line wire W2. Thus the slow clock may receive as many as 15 impulses and will be advanced until its cam 74 closes the contacts SRC1 and opens contacts SRC2 to transfer such clock from the A wire to the B wire causing it to stop. The point at which this takes place during the first minute of operation of the cycle controlled will depend, of course, on how much the clock is behind. The more the clock is late the longer it will take to synchronize it with the others. If the clock is more than 15 minutes slow the remainder must be made up during the synchronizing period following the one under consideration.

At 59 minutes and 45 seconds the contacts BC3 are closed and the contacts BC2 also close. This enables the master clock to receive the 60th minute impulse from the contacts B of relay MIR, as explained above. Any clocks which have been transferred to the B wire because of their being on time, ahead of time, or brought into synchronism will receive their impulses through the B wire and contacts BC2. The clocks which are still late will receive their impulses directly from the A wire.

For the purpose of correcting the system as a whole without regard to whether the clocks are fast, on time, or slow, there is provided a time correcting controller comprising the impulsing motor IM, the advance relay AR, the retarding relay RR, the correcting switch CS, and the manual correcting controller MCC.

The impulsing motor IM may consist of a synchronous motor similar to the motor CM driving the cam 85 which actuates contacts IMC1 and IMC2 at, say 2 second intervals.

The correcting switch CS may consist of a conventional three position key switch of the type often used in telephone switchboards arranged, when moved clockwise in Fig. 9 to the advance position ("ADV."), to close contacts AC; and, when moved counterclockwise to retard position ("RET."), to close contacts RC. The construction of the manual controller MC is shown in Figs. 6, 7, and 8.

The manual correcting controller includes a frame comprising a back plate 90 (Figs. 6 and 7) and a front plate 91 of which the major portion is circular as best shown in Fig. 6. These plates are spaced by means of rectangular posts 92 and may be mounted on the back of a suitable panel 93 from which the plate 91 is separated by means of spacers 94. Rotatably mounted in the plates 90, 91, is a shaft 95 concentric with which is dial 96 (see Fig. 8 also) secured to the front face of the panel 93. Secured to the outer end of the shaft 95 is a knob or finger piece 97 having a pointer portion 97a. Fixed on the shaft 95 between the plates 90, 91 is a ratchet 98 with which cooperates a non-return pawl 99 pivoted on the plate 90 and actuated into engagement with the ratchet 98 by a spring 100 which is anchored to the tail of the pawl and to an offset lug 90a formed in the plate 90.

The plate 91 is bent horizontally to form a flange or shelf 91a on the top surface of which is supported an angular magnet yoke 101 of a stepping magnet SM. Pivoted at 102 (Fig. 6) is an armature 103 having pivoted at 103a a feed pawl 104 formed with an offset lug 104a engaging the ratchet 98. The armature 103 is formed with an ear 103b to which is anchored a spring 105, the other end of which is anchored to a lug 91b formed in plate 91. This spring 105 urges the armature 103 in a counterclockwise direction (Fig. 6) and holds the armature against an adjustable stop screw 107 threaded into a hole in the left hand post 92. A spring 108, connected to pawl 104 and to a cotter pin received in a hole in the armature 103, holds the pawl 104 in engagement with the ratchet 98.

When the magnet SM is energized, it attracts the armature 103 thereby moving the pawl 104 idly to the right in Fig. 6 one tooth space. When the magnet SM is deenergized, the spring 105 draws the armature 103 back to the position of Fig. 6 thereby rotating the ratchet 98 one tooth space.

Secured to the shaft 95 is a cam 109 (Figs. 6 and 7) which actuates a pair of contacts designated CC3, CC4 insulatably mounted on a bracket 90b carried by plate 90. The cam 109 is so positioned that when the pointer portion 97a registers with zero on dial 96, as in Fig. 8, the cam will occupy the position shown in Fig. 6 in which it has just closed the contacts CC3, CC4.

The operation of the time correcting controller will now be explained by means of a specific example.

It will be assumed that the ship's officers have made the necessary observations at noon and have ascertained the ship's longitude, and have found that fifteen minutes retarding of the clocks is required during the day to correct the clocks to the true time. At the time decided upon for effecting the correction of the clocks, knob 97 will be grasped and turned clockwise in Fig. 8 until the pointer portion 97a registers with "15" on the dial 96. The correcting switch CS is then moved to retard position thereby closing the contacts RC (Fig. 9). The moving of the pointer portion 97a as aforesaid also rotates shaft 95 and causes the cam 109 to move out of cooperation with contacts CC3, CC4 thereby permitting them to open.

The closure of the contacts RC energizes the retard relay RR over a circuit as follows: Line wire W1, wire W7, the coil of the retard relay RR, contacts RC, and contacts f of the advance relay AR, to line wire W2. The retard relay RR closes its contacts b, c, e, and g and opens its contacts a, d, and f. The closure of the contacts e connects the impulsing motor IM directly across the line wires W1, W2, thereby causing the cam 85 to rotate and close the contacts IMC1 and IMC2 at two second intervals. This, of course, causes the minute impulse relay MIR to be energized at two second intervals by a circuit from line wire W1, through contacts IMC3, IMC2, and relay MIR to line wire W2.

The rectifier R is also connected across the line wires W1, W2 through the contacts IMC1, IMC2 in series whereby the magnet SM will be impulsed at two second intervals. In cases where a source of direct current is available, the magnet SM may be connected directly in series with contacts IMC1, IMC2 and the rectifier R omitted. Thus, for each energization of the relay IMR, there is a corresponding energization of the magnet SM causing the ratchet 98 to be rotated counterclockwise (Fig. 6) one tooth space for each energization of the relay MIR. Closure of contacts g of relay RR establishes a holding circuit for this relay by shunting the portion of the circuit for the relay including the contacts RC and contacts f of relay AR. Closure of the contacts c of relay RR connects the A and B wires together. The closure of contacts b or relay RR connects the wire C1 to the line wire W1. Any impulse through contacts a of relay MIR is delivered to both the A and B wires.

In consequence of the closure of the contacts b of relay RR, impulses are transmitted to the retarding magnets RM of all the clocks and the master clock magnet MRM over circuits similar to those first traced above, through the contacts SRC1 or SRC2, depending upon the status of the clock and the time at which the correction is effected. Thus, all the clocks will be retarded the extent of one minute for each impulse delivered to the relay MIR and to the stepping magnet SM by the contacts IMC1, IMC2.

After fifteen impulses have been delivered to the relay MIR and magnet SM by the contacts IMC1, IMC2, the ratchet 98 will have advanced fifteen steps back to the zero position in which the cam 109 recloses both the contacts CC3 and CC4. Closure of contacts CC3 establishes a low resistance shunt around the coil of relay RR between the wire W1 and contacts g which, it will be recalled, maintain the holding circuit for relay RR. This shunt is made through a resistance SR and causes the relay RR to become deenergized. The deenergization of relay RR, by the opening of its contacts e, stops the impulsing motor IM and prevents further impulses to the relay RR and magnet SM. Thus, after fifteen impulses, the impulse controller is restored to idle condition.

In the event that it was desired to advance the clocks instead of retarding them by a like amount, the operation would be similar and would be effected, after setting pointer 97a to "15," by moving the correcting switch CS to advance position. This will result in energizing the advance relay AR through the contacts AC, and contacts f of relay RR, the contacts g of relay AR causing it to establish the holding circuit. Contacts e and c of relay AR have the same effect as the corresponding contacts of relay RR of starting the impulse motor IM and connecting the A and B wires together. Since relay AR does not affect contacts a and b of relay RR, the advance magnets AM, MAM of all the clocks will remain connected to the wire C2 whereby the impulses through contacts IMC1, IMC2 will have the effect, through the energization of relay MIR, of advancing the clocks fifteen minutes instead of retarding them. In this case, contacts CC4 function to stop the correcting controller.

The circuits through the magnets AM, RM will go by way of either the A wire and contacts SRC2, or the B wire and contacts SRC1 depending upon the time and the status of the clocks. For example, if the correction were to be effected during the ten minute supervisory period from the fiftieth minute to the sixtieth minute, some of the clocks might be fast and have become transferred to the B wire in which case they would be advanced in step with other clocks through the contacts SRC1. Similarly, when the correction is effected a few minutes after the hour, the on time clocks may still be on the B wire and may get their impulses through the contacts SRC1.

The range of fifty minutes correction permitted by the correcting controller is more than ample for marine use because of the fact that, save for a few exceedingly fast vessels, the daily correction required will not exceed approximately 45 minutes. The 50 minute range on the dial provides ample correction capacity so that corrections on the slower vessels may be made at intervals of several days in a single operation if preferred.

It is not necessary that the movements for the clocks comprise motors having double armatures and double field coils with the shading coils reversed. If desired, the motors may be constructed as shown in Figs. 10 and 11 in which the parts identical in shape or function with the ones shown in Figs. 1 to 3 are identically designated. The motor shown in Fig. 10 has a single coil designated AM and a single armature 44 but, instead of having a single set of shading coils 42, the pole pieces are each provided with two shading coils 42a, 42b per pole piece. The shading coils, instead of being continuous rings of high conductivity metal, are split and shaped at the point of split to provide contact faces or terminal lugs 42c.

Loosely mounted on the shaft 41 or, preferably, upon a relatively fixed bushing concentric with the shaft, is a T-lever 112 which insulatably supports two contact fingers 113 located diametrically opposite each other relative to the shaft 41. The fingers 113 are so arranged that when the T-lever 112 is in the advance position of Fig. 10, the terminal elements 42c of the shading coils 42b will be connected together so as to conductively connect the open circuited ends of the shading coils whereby they will have the same effect as the shading coils 42 in Fig. 1, that is, will cause clockwise rotation of the shaft 41 when the coil AM is energized. When the T-lever 112 is shifted counterclockwise in Fig. 10, the terminal portions 42c on the shading coils 42a will be electrically connected to cause the armature 44 to rotate counterclockwise.

For the purpose of controlling the T-lever 112 there is provided a reversing magnet RM consisting of a solenoid with its plunger 114 having a pin and slot connection to one arm of a lever 115. The latter is pivoted at 116 to a plate 117 secured to the left hand pole piece 36 by means of a bolt 118. The other arm of the lever 115 is connected by a link 119 to the T-lever 112. A spring 120, anchored to a pin carried by the plate 25 and to the lever 115, urges said lever in a clockwise direction and normally holds the T-lever in the position of Fig. 10.

In Fig. 11 there is shown a modified form of wiring enabling the motor of Fig. 10 to be used in circuit of Fig. 9. When the reverse relay RR is energized as described above in retarding the motor, the contacts b connect the wire C2 to the line wire W2. All of the coils RM of the clock motors of the system are connected in parallel between the line wires C1, C2 whereby the closure of contact b of relay RR results in the energization of all coils RM. Thus, whenever the coils AM are impulsed, the clocks will be retarded instead of advanced.

Since the impulsing motor is likely to stop in any position, there is a possibility that it may stop in such a position that contacts IMC1, IMC2 remain closed. This would cause relay MIR to remain continuously energized thereby stopping all of the clocks. Contacts IMC3 may be actuated by the stator flux of motor IM, through an armature lever 110 in the same way as the lever 62 in Fig. 1, to open contacts IMC3 when current to motor IM is interrupted. Thus, relay MIR cannot be kept energized after motor IM stops regardless of the status of contacts IMC1, IMC2.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a time keeping system, a plurality of secondary clocks and a master clock, each of said secondary and master clocks comprising time indicating means and normally idle motor means connected to the time indicating means and adapted to advance or retard the latter one minute upon each energization of the motor means; means to control the direction of movement of the time indicating means of all said clocks by their respective motor means, said direction control means being normally conditioned to cause the motor means of said clocks to advance their related time indicating means, impulse producing means electrically connected to the motor means of said master clock and each of said secondary clocks, means for operating said impulse producing means at minute intervals, setting means comprising a graduated member and an index member, one of said members being manually adjustable in relation to the other, setting motor means to move said adjustable member one graduation at a time, means to cause a series of simultaneous operations of said impulse producing means and said setting motor means in rapid succession, and means controlled by said setting means upon arrival of said adjustable member at a certain graduation to terminate said simultaneous operations.

2. In a time keeping system, a secondary clock comprising time indicating means including a minute shaft and a normally idle motor mechanism having a driving connection with said time indicating means, said motor mechanism being adapted to drive said time indicating means for a movement of one minute upon each energization of its motor, electrical impulse producing means, means to operate said impulse producing means periodically, two parallel electrical conductors connected to said impulse producing means, transfer means to connect said motor alternatively to said conductors, means to interrupt one of said conductors during certain periods, a member operating on said minute shaft for shifting said transfer means to connect said motor to said interruptable conductor, said operating member being mounted on said minute shaft so as to be yieldingly held in a certain position thereon and a detent engageable with said operating member in the position of the latter where the next stop of the minute shaft will cause said operating member to shift said transfer means, said detent being moved to engaging position upon energization of said motor and moved to release said operating member when said motor is deenergized.

3. A clock system comprising a series of master and secondary clocks, each having a reversible movement including a retarding control and an advance control; means to select said controls according to whether the clocks are to be retarded or advanced, impulsing means for the selected controls, and presettable means to predetermine the extent of advance or retarding of the clocks.

4. A clock system comprising a series of secondary clocks and a master clock, selectable means in each clock for causing the clock to be advanced or retarded, impulsing means for the selectable means of all the clocks in said system, an advance-retard selector for controlling the impulsing of the selectable means, and presettable means for controlling the impulsing means to determine the extent of advance or retarding of said clocks.

5. A system of master and secondary clocks, each clock having a movement provided with selective means to effect a step-by-step forward or reverse movement of the time indicating means and selectable to determine whether the clock is to be advanced or retarded, an impulse source for said means, control means to select said first named means for operation and render the first named means receptive of impulses from the impulse source, and means for limiting the number of impulses from said source to said first named means including a member variably settable to predetermine the number of impulses received from said source.

6. A clock movement comprising time displaying means; a motor for driving said displaying means, including an advance coil and a retard coil for controlling the direction of motion of the time displaying means; means for impulsing said coils, and a time train for coupling said motor to said displaying means including a clutch mechanism controlled by a selected one of said coils for limiting the motion of the displaying means by said motor to a predetermined extent for each impulse to said coil.

7. A clock system comprising a series of master and secondary clocks, each having a reversible electric motor driven movement and including a retarding coil and an advance coil; circuit means to select said coils according to whether the clocks are to be retarded or advanced, an impulsing circuit for the selected coils, and presettable means to predetermine the number of advance or retarding impulses to the clocks.

8. A clock system comprising a series of secondary clocks and a master clock, selectable impulse receiving means in each clock for causing the clock to be advanced or retarded, means for impulsing the impulse receiving means of all the clocks in said system, an advance-retard selector for selecting the impulse receiving means to receive impulses from the impulsing means, and presettable means for controlling the impulsing means to control the number of advance or retarding impulses received by said clocks.

9. A system of master and secondary clocks, each having a movement provided with electrically operated means to effect a step-by-step forward or reverse movement of the time indicating means including advance and retard coils selectable to determine whether the clock is to be advanced or retarded; an electrical impulse device and circuit for said coils, control means to selectively connect said coils to said circuit to render one or the other of said coils receptive of impulses from the impulse source; and means for limiting the number of impulses over said circuit from said source to said coils, including a member variably settable to predetermine the number of impulses.

10. A clock movement comprising time displaying means; a motor for driving said displaying means, including selectable advance and retard coils for controlling the direction of operation of the time displaying means; and a time drive train for coupling said motor to said displaying means, including a clutch mechanism controlled by both of said coils for limiting the operation of the displaying means by said motor to a predetermined extent for each impulse to a selected coil.

11. In a periodically supervised self-regulating time system, a master clock and a series of secondary clocks, means to impulse the secondary clocks at regular intervals to advance said clocks in step with the master clock, said clocks, including the master clock, having a plurality of selectable impulse receiving elements for determining whether the clocks are to be advanced or retarded; means to normally render the advance impulse receiving means operative to receive impulses to cause all the clocks to normally advance; and correction control means including a second impulse source for advancing the clocks at a rapid rate, means to at will render the retard impulse receiving means or advance impulse receiving means operative, and means to limit the number of impulses to said clocks by the second source to a predetermined amount of correction.

12. A clock comprising a time drive train, a driving motor having selectively impulsable forward and advance rotation coils and common rotor means, a normally ineffective clutch connecting said train to the rotor means; and means rendered operative by the impulsing of either coil to simultaneously render said clutch effective, said means including means to prevent more than a predetermined extent of advance or retarding of the time train for each impulse to the operative coil.

13. A clock having a time drive train, a motor drive unit including two coils for effecting forward and reverse rotation of the motor, and clutch mechanism for limiting the extent of movement of the time drive for each energization of either of said coils and rendered operative each time one of said coils is energized.

14. A time system comprising master and secondary clocks, each clock having means to drive its time indicating means both forward and backward and means to control the direction of drive; and a centralized time correction control station having means to selectively control the direction of drive of all the clocks and means to predetermine the extent of simultaneous advance or reverse drive of said clocks by their driving means.

15. In a self regulating time system, master and secondary clocks, each clock having reversible driving means and including selectively operable means to determine the direction of drive of the clock; a self regulating circuit connecting said clocks and controlled by said master clock, and a central correction station for said system including an advance-retard control for the selectively operable means to cause all of the clocks to be advanced or all retarded at will and including a control device for advancing or retarding said clocks over said circuit, said control device including a member settable to the extent of time correction required.

16. In a time keeping device, means movable to represent time, a time train including a member rotatable fixed increments each of which corresponds to moving the first means a unit of time, a movable detent normally positioned in the path of said member to lock the time train and releasable to permit moving the first means an increment, a second detent movable to a position to arrest said member subsequent to the release of the first detent and at the end of one of said increments, and a normally idle drive motor geared to the time train and having means to operate both said detents whereby to effect movement of the first means a unit of time for each driving impulse of said motor.

17. In a time keeping device, time displaying means, a rotary drive member geared to the time displaying means; a device normally coacting with said member to lock the time displaying means, said device being releasable to permit the rotary member to rotate a fixed extent to thereby advance the time displaying device an increment representing a unit of time, and a reversible driving motor for said indicating device having at least one coil operative to release said locking device each time said coil is impulsed.

18. A movement for a time device having time representing means, comprising a time train including a member movable fixed increments to correspond to a unit of time movement of the time representing means; a device normally holding said member, said time train, and said representing means against movement and releasable to permit the member to move an increment corresponding to a unit of time, said device having means rendered effective upon release of said device for limiting the movement of said member to one increment; a normally inactive driving motor coupled to said train, and means for simultaneously releasing said device and rendering active said motor.

19. A clock movement having a time train, a reversible driving motor, means coupling said motor to said time drive and adapted to limit actuation of the time train to a single unit of time for each operation of the motor, selectable means in said movement for determining the direction of drive of the time train by said motor, and means rendered effective by the selectable means for rendering the coupling means effective.

ALFRED L. SPRECKER.

CERTIFICATE OF CORRECTION.

Patent No. 2,379,836. July 3, 1945.

ALFRED L. SPRECKER.

It is hereby certified that error appears in the printed specification of the above numbered patent requiring correction as follows: Page 7, first column, line 24, for the word "stop" read --step--; and that the said Letters Patent should be read with this correction therein that the same may conform to the record of the case in the Patent Office.

Signed and sealed this 9th day of October, A. D. 1945.

Leslie Frazer (Seal) First Assistant Commissioner of Patents.